2,755,291

CERTAIN QUATERNARY AMMONIUM AZIDES

Robert H. Broh-Kahn, Hastings-on-Hudson, Theodore I. Fand, White Plains, and Leon E. Tenenbaum, Ardsley, N. Y., assignors to Nepera Chemical Co., Inc., Yonkers, N. Y., a corporation of New York No Drawing. Application October 7, 1954,
Serial No. 461,018

8 Claims. (Cl. 260—349)

This invention relates to certain novel azides, and relates more particularly to the azides, or hydrazoic acid salts, of quaternary ammonium compounds of the following formula:

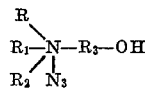

wherein R, $R_1$ and $R_2$ are lower alkyl groups having from one to three carbon atoms, and $R_3$ is a divalent aliphatic hydrocarbon radical having one to four carbon atoms. These compounds are valuable hypotensive agents and are effective in producing a pronounced and prolonged drop in blood pressure either by intravenous or oral administration.

An object of this invention is the preparation of certain novel organic salts of hydrazoic acid which are useful as hypotensive agents.

Another object of this invention is the preparation of hypotensive agents which are effective at low dosage levels and which may be administered both orally and intravenously.

Other objects of this invention will appear from the following detailed description.

We have found that by reacting hydrazoic acid, $HN_3$, with a quarternary ammonium hydroxide of the formula

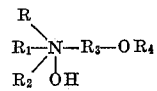

wherein R, $R_1$ and $R_2$ are lower alkyl groups having from one to three carbon atoms, i. e. a methyl, ethyl or propyl group; $R_3$ is a divalent aliphatic hydrocarbon radical having one to four carbon atoms, and $R_4$ is hydrogen, or a methyl, ethyl, or propyl group, the hydroxy group on the pentavalent nitrogen is replaced by an azide group and hydrazoic acid salts having valuable hypotensive activity are obtained.

As examples of quaternary ammonium hydroxide compounds which may be reacted with $HN_3$ to form said novel azides, there may be mentioned compounds such as trimethylhydroxyethyl-ammonium hydroxide, also known as choline, trimethylhydroxypropyl-ammonium hydroxide, trimethyl-($\beta$-methyl)-hydroxyethyl-ammonium hydroxide, also known as $\beta$-methyl choline, and trimethylhydroxybutyl-ammonium hydroxide.

The reaction of said quaternary ammonium hydroxide bases with hydrazoic acid may be carried out conveniently by passing vapors of hydrazoic acid through an aqueous solution of the free base. Further, the same reaction may be brought about by the addition of an aqueous or alcoholic solution of $HN_3$ to an aqueous or alcoholic solution of quaternary base in stoichiometric quantities. An aqueous or alcoholic solution of the salts of the free base such as the bicarbonate, bisulfite or any weak, displaceable acid may also be utilized. The reaction is readily effected at temperatures of $-20°$ C. to $50°$ C.

In order further to illustrate my invention but without being limited thereto, the following examples are given:

Example I 3.8 parts by weight of sodium azide are placed in a reaction vessel and 18 parts by weight of concentrated sulfuric acid slowly added to generate hydrazoic acid, $HN_3$. The hydrazoic acid formed is passed through 16.7 parts by weight of an aqueous solution containing 48% by weight of the bicarbonate of trimethylhydroxyethyl-ammonium hydroxide, i. e. choline, with the aid of a stream of nitrogen. The resulting aqueous solution obtained after completing the reaction comprises a 35% by weight aqueous solution of choline azide.

Example II 0.2 mol of choline chloride (other choline salts, such as choline citrate, may be used) is dissolved in 100 ml. water. To this solution the basic form of 1RA-400 Amberlite resin is added until a pH of 11.9 is reached. A small excess of resin is then further added, and the mixture is filtered immediately to remove the resin. Free hydrazoic acid (prepared from sodium azide and sulfuric acid) is then bubbled into the aqueous solution of free choline base until a pH of 7.5 is reached. The water is removed under vacuo leaving an oily residue of choline azide.

An alternative procedure for preparing choline azide comprises reacting choline chloride or other choline salt with a metal azide such as sodium azide in methanol or other suitable solvent in which the reactants are soluble and the metal salts formed are substantially insoluble. The sodium chloride formed as a byproduct precipitates from solution and may be filtered off. On evaporation of the solvent, choline azide is obtained as an oily residue.

It is understood that the foregoing detailed description is given merely by way of illustration and that many variations may be made therein without departing from the spirit of our invention.

What we claim is:

1. Azides of the following formula:

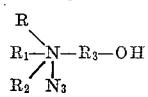

wherein R, $R_1$ and $R_2$ are lower alkyl groups having one to three carbon atoms, and $R_3$ is a divalent aliphatic hydrocarbon radical having one to four carbon atoms 2. The azide of the formula:

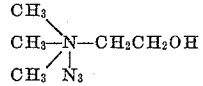

3. Process for the preparation of quaternary ammonium azides of hydroxide compounds of the formula:

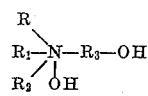

wherein R, $R_1$ and $R_2$ are lower alkyl groups having one to three carbon atoms, and $R_3$ is a divalent aliphatic hydrocarbon radical having one to four carbon atoms, which comprises reacting said quaternary ammonium hydroxide compound with hydrazoic acid.

4. Process in accordance with claim 3 wherein said reaction is carried out in an aqueous reaction medium.

5. Process in accordance with claim 3 wherein said reaction is carried out in an aqueous reaction medium and the azide separated by evaporating the aqueous solvent.

6. Process for the preparation of choline azide, which comprises reacting choline with hydrazoic acid.

7. Process for the preparation of choline azide, which comprises reacting choline with hydrazoic acid in an aqueous medium.

8. Process for the preparation of choline azide, which comprises reacting choline with hydrazoic acid in an aqueous medium and separating the choline azide formed by evaporating the aqueous solvent.

No references cited.